United States Patent
Lih et al.

(10) Patent No.: US 9,600,440 B2
(45) Date of Patent: Mar. 21, 2017

(54) NETWORK TOPOLOGY OF HIERARCHICAL RING WITH RECURSIVE SHORTCUTS

(71) Applicant: Futurewei Technologies, Inc., Plano, TX (US)

(72) Inventors: Iulin Lih, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 117 days.

(21) Appl. No.: 14/528,955

(22) Filed: Oct. 30, 2014

(65) Prior Publication Data
US 2015/0117267 A1    Apr. 30, 2015

Related U.S. Application Data

(60) Provisional application No. 61/897,291, filed on Oct. 30, 2013.

(51) Int. Cl.
*H04L 12/24* (2006.01)
*G06F 15/173* (2006.01)
*H04L 12/721* (2013.01)
*H04L 12/437* (2006.01)
*G06F 15/78* (2006.01)

(52) U.S. Cl.
CPC .... *G06F 15/17362* (2013.01); *G06F 15/7825* (2013.01); *H04L 12/437* (2013.01); *H04L 45/06* (2013.01); *Y02B 60/1207* (2013.01); *Y02B 60/1225* (2013.01)

(58) Field of Classification Search
CPC .................................. H04L 41/12; H04J 14/00
USPC ............................................................ 370/258
See application file for complete search history.

(56) References Cited

U.S. PATENT DOCUMENTS

| | | | |
|---|---|---|---|
| 8,711,803 B1* | 4/2014 | Wang .................. | H04W 36/023 370/206 |
| 9,065,582 B2* | 6/2015 | Barry ...................... | H04J 14/00 |
| 2008/0276091 A1* | 11/2008 | Welin .................... | H04L 67/104 713/170 |
| 2010/0142961 A1* | 6/2010 | Wisseman .......... | H04J 14/0212 398/83 |
| 2011/0206053 A1 | 8/2011 | Henry et al. | |
| 2001/4007892 | 3/2014 | Thurbert et al. | |

OTHER PUBLICATIONS

Kitani, T., et al., "A configuration method for structured P2P overlay network considering delay variations," International Conference on Network-Based Information Systems, Aug. 19, 2009, pp. 547-552.
(Continued)

*Primary Examiner* — Wei Zhao
(74) *Attorney, Agent, or Firm* — Conley Rose, P.C.

(57) ABSTRACT

An interconnection system comprising a plurality of nodes, each comprising at least two ports, and a plurality of links configured to interconnect ports among the nodes to form a hierarchical multi-level ring topology, wherein the ring topology comprises a plurality of levels of rings including a base ring and at least two hierarchical shortcut rings, and wherein each node connected to a higher-level shortcut ring is also connected to all lower-level rings including the base ring.

9 Claims, 9 Drawing Sheets

(56) References Cited

OTHER PUBLICATIONS

Wang, J., et al., "A Survey and Comparison of Multi-Ring Techniques for Scalable Battlespace Group Communications," Proceedings of SPIE, vol. 5820, May 26, 2005, 12 pages.
Foreign Communication from a Counterpart Application, PCT Application No. PCT/US2014/063234, International Search Report dated Jan. 30, 2015, 4 pages.
Foreign Communication from a Counterpart Application, PCT Application No. PCT/US2014/063234, Written Opinion dated Jan. 30, 2015, 7 pages.

\* cited by examiner

NETWORK TOPOLOGY OF HIERARCHICAL RING WITH RECURSIVE SHORTCUTS

CROSS-REFERENCE TO RELATED APPLICATIONS

The present application claims benefit of U.S. Provisional Patent Application No. 61/897,291 filed Oct. 30, 2013 by Iulin Lih and entitled "Network Topology of Hierarchical Ring with Recursive Shortcuts," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An interconnection network or system enables data communication among its components or nodes. Exemplary interconnection networks include switches, routers, processor-memory systems, input/output (I/O) systems, system-on-chip (SoC), network-on-chip (NoC), and multiple-chip systems. An SoC integrates all the functionality of a computer or other complex electronic data system onto a single integrated circuit or chip. Data in an interconnection network may be exchanged from one node to another node in a transaction, which comprises phases such as a request for data, a transmission of the data, and an acknowledgment of receipt of the data. The data may be exchanged in the form of a message or a packet, which typically comprises a header containing control information and a payload containing the intended data.

Network topology refers to the arrangement of the nodes in an interconnection network. Topology design affects network performance, cost, power use, and flexibility, etc. For example, a first type of topology may provide for faster transaction completion compared to a second type of topology, but may require more expensive hardware compared to the second type of topology. Consequently, topology design involves weighing many factors and is an important aspect of network implementation.

SUMMARY

In one embodiment, the disclosure includes an interconnection system comprising a plurality of nodes, each comprising at least two ports, and a plurality of links configured to interconnect ports among the nodes to form a hierarchical multi-level ring topology, wherein the ring topology comprises a plurality of levels of rings including a base ring and at least two hierarchical shortcut rings, and wherein each node connected to a higher-level shortcut ring is also connected to all lower-level rings including the base ring.

In another embodiment, the disclosure includes a node, in a recursive ring network topology comprising a plurality of nodes, comprising a first port for coupling to an adjacent first node via a base link in a base ring, a second port for coupling to a non-adjacent second node via a first shortcut link in a first level shortcut ring, and a third port for coupling to a non-adjacent third node via a second shortcut link in a second level shortcut ring, wherein a number of intermediate nodes positioned between the third node and the node along the base ring is at least double a number of intermediate nodes between the second node and the node along the base ring, wherein all nodes connected to the second level shortcut ring are also connected to the first level shortcut ring, and wherein at least one node connected to the first level shortcut ring is not connected to the second level shortcut ring.

In yet another embodiment, the disclosure includes a method of routing messages in a recursive hierarchical ring network topology by a first node, the method comprising receiving a message from a second node over a shortcut link in a level k shortcut ring, wherein the first and second nodes are separated by $(2^k-1)$ intermediate nodes along a base ring, wherein k is an integer that satisfies relationship $1<=k<=(\text{Log}_2(N)-1)$, wherein N is a positive integer representing a total number of a plurality of nodes available in the network topology, determining a shortest path to a third node that is along a route of the message to an intended destination node, wherein the shortest path is selected from a group of paths that traverse the recursive hierarchical ring network topology in a clockwise direction or a counter clockwise direction, but not both, and transmitting the message to the third node over the determined shortest path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of hierarchical ring network topologies that improve both bandwidth and latency by adding recursive shortcuts to a base ring network topology. The base ring, sometimes referred to as a level 0 ring, connects every node like a simple ring network topology, upon which multiple levels of recursive shortcut rings are added. In the recursive shortcut rings, nodes positioned along any higher-level shortcut ring are selected from a subset of a set of nodes positioned along a lower-level shortcut ring. For example, a level 1 shortcut ring connects a subset (e.g., some but not all) of the nodes in a base ring. A level 2 shortcut ring connects a subset of the nodes in the level 1 shortcut ring. This process may be recursively iterated to higher levels. Nodes on each level can be selected mathematically based on their node indexes or addresses. For instance, in a level k ring, each two adjacent network nodes connected by a shortcut link are separated by $(2^k-1)$ intermediate nodes in the base ring, where k is an integer that satisfies relationship $1<=k<=(Log_2(N)-1)$, and where N is a positive integer representing a total number of nodes in the ring topology. Associated regular jump distances, which are predictable based on mathematical equations, may simplify the determination of a shortest path to a next hop across the hierarchical ring network.

This disclosure defines a hierarchical ring network topology that offers a log rule based scalable latency and bandwidth and has implementation-friendly characteristics and low-cost node station structures. This disclosure includes a high performance and low cost routing algorithm that offers low implementation cost in ring buffering and control logic, as well as simple control logic to reduce component area and required cycle times. In so doing, the disclosed embodiments provide various advantages including a simplified communication overhead in both cost and latency between the producers/request units and consumers/service units, improved delivery throughput and performance, improved power efficiency, improved scalability for the parallel computing system, improved system upgrade/migration productivity, and improved time to market.

Figure 1:
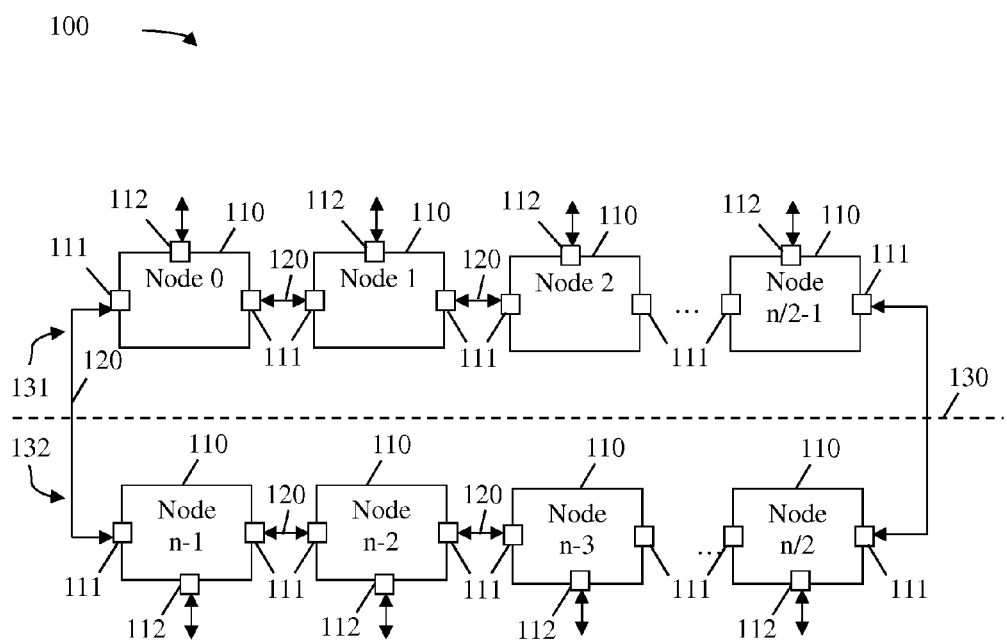
FIG. 1 is a schematic diagram of a network with a base ring topology.

FIG. 1 is a schematic diagram of a network 100 with a base ring topology. The network 100, sometimes referred to as a ring network or an interconnection system, comprises a plurality of nodes 110 interconnected by a plurality of links 120. The term link is used interchangeably with the term connection herein and refers to any physical or logical connection for transferring data. The links 120 are bi-directional links that can transfer data in opposite directions. The nodes 110 are any network elements (NEs) that send and/or receive (i.e., transceive) data in the network 100. For example, in a communication network, the nodes 110 may be routers, switches, and/or bridges, and the links 120 may be cables and/or optic fibers. In an SoC and/or NoC system, the nodes 110 may be processing cores, memory blocks, timing sources, and/or peripherals, and the links 120 may be switching fabric wires. In a printed circuit board, the nodes 110 may be any devices, modules, units, and/or components, and the link 120 may be wires. In a data center, the nodes 110 may be network equipment, such as servers, and the links 120 may be backplane cables.

Each node 110 comprises two interconnect ports 111 and an inject/eject (I/E) port 112, all of which are bi-directional physical ports. In the network 100, each node 110 is interconnected to two adjacent nodes 110 via the two interconnect ports 111 to form the ring topology. Each node 110 may act as a data source and/or a data sink. For example, when a node 110 is a data source, data is injected into the network 100 via the I/E port 112. Alternatively, when a node 110 is a data sink, data is ejected from the network 100 via the I/E port 112. As such, when data arrives at a node 110, the data may be transferred to a next node 110 and stay in the network 100 or exit the network 100. The ring topology shown in the network 100 uses a comparatively simple routing algorithm, since at each node there is no branch. A message on the ring may either proceed to a next node by staying on the ring or may get off of the ring and potentially reach any number of nodes 110. However, the ring topology of the network 100 yields a low bandwidth and a long latency.

For example, data may be transferred between any two nodes 110, a source node and a destination node, in a clockwise direction or in a counter clockwise direction in the network 100. When transferring data between non-adjacent nodes 110, the data traverses through multiple intermediary nodes 110 and links 120. The number of intermediary nodes 110 through which data traverses between a source and a destination is referred to as a hop count. As shown in the network 100, the number of nodes 110 is n and the maximum number of hops is about n/2 based on the clockwise transfer and the counter clockwise transfer. Considering all nodes, the average number of hops is about n/4. The maximum number of hops and the average number of hops provide a latency measure for the network 100.

The line 130 represents a bisectional cut that divides the network 100 into two equal portions 131 and 132, each comprising the same number of nodes 110. The bisectional bandwidth refers to the total sum of bandwidth in each portion 131 or 132. The bisectional bandwidth is a measure for determining network performance. For example, when each node 110 injects data into the network 100 at an injection rate of I and each link 120 supports a bandwidth of J, a required bisectional bandwidth is about $$\frac{n \times I}{2}$$

and a supported bisectional bandwidth is about 4×J. Thus, the values n, I, and J are restricted to relationship n×I≤8×J. Table 1 below summarizes the network performance parameters for the network 100.

TABLE 1

| Network Performance for the Network 100 | |
|---|---|
| Maximum number of hops | $\frac{n}{2}$ |
| Average number of hops | $\frac{n}{4}$ |
| Required bisectional bandwidth | $\frac{n \times I}{2}$ |
| Supported bisectional bandwidth | $4 \times J$ |

Figure 2:
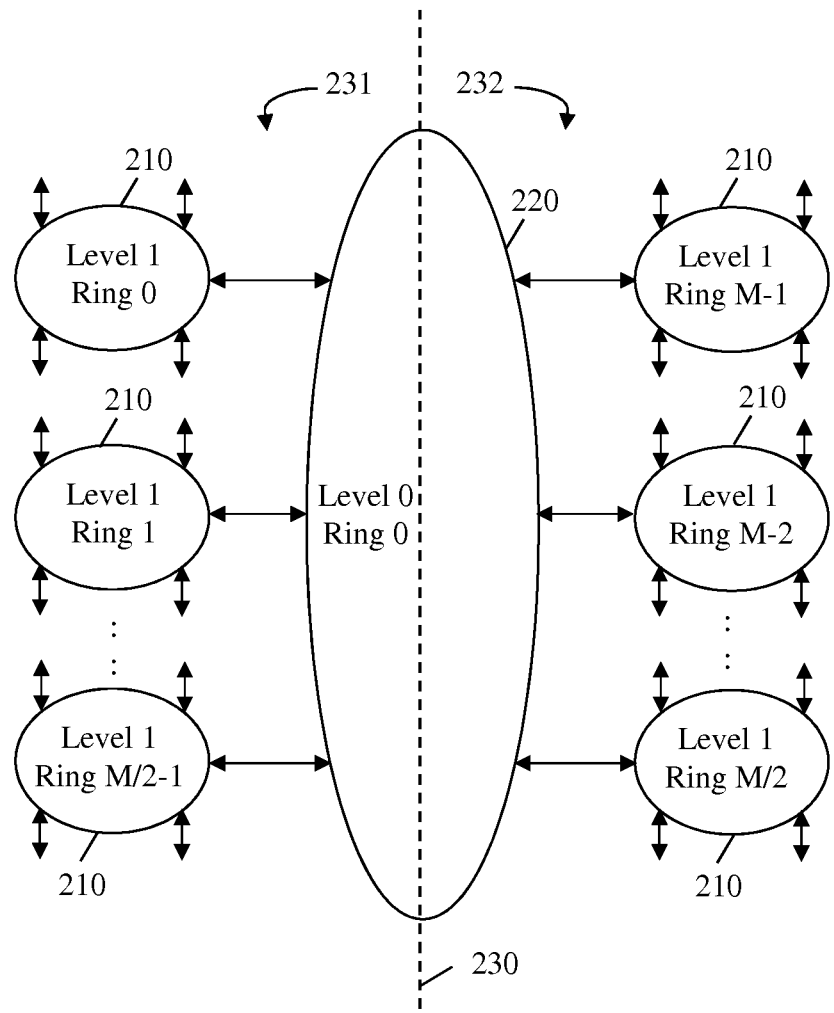
FIG. 2 is a schematic diagram of another network with a hierarchical ring topology.

FIG. 2 is a schematic diagram of another network 200 with a hierarchical ring topology. The network 200, sometimes referred to as a hierarchical ring network, comprises a plurality of level 0 ring networks 210 interconnected by a level 1 ring network 220. Each level 0 ring network 210 and the level 1 ring network 220 may have structures similar to the network 100. For example, each level 0 ring network 210 and each level 1 ring network 220 comprises a plurality of nodes, similar to the nodes 110, interconnected by links, similar to the links 120, to form a ring network. However, the network 200 divides a total n number of nodes 210 into N×M nodes, where n=N×M. N nodes form a level 0 ring network 210. Thus, network 200 comprises M level 0 ring networks 210, each comprising N nodes. The level 1 ring network 220 connects the M level 0 ring networks 210 to enable data transfer between any level 0 ring networks 210. The level 1 ring network 220 operates similar to a ring network with M nodes.

Similar to the line 130 in the network 100, a line 230 represents a bisectional cut that divides the network 200 into two equal portions 231 and 232, each comprising the same number of nodes. In the network 200, the maximum number of hops is about N/2 in each level 0 ring network 210 and the maximum number of hops is about M/2 in the level 1 ring network 220. To transfer data from any node in a level 0 ring network 210 to any node in another level 0 ring network 210, the maximum number of hops is about $$N + \frac{M}{2}.$$

Thus, the average number of hops is about $$\frac{N}{2} + \frac{M}{4}.$$

Similar to the network 100, each N node in the level 0 ring network 210 or each M node in the level 1 ring network 220 injects data in to the network 200 at an injection rate of I and each link supports a bandwidth of J. Thus, the required bisectional bandwidth is about $$\frac{N \times M \times I}{2}$$

and the supported bisectional bandwidth is about J×4. The following Table 2 summarizes the network performance parameters for the network 200.

TABLE 2

Network Performance for the Network 200

| Maximum number of hops | $N + \frac{M}{2}$ |
| --- | --- |
| Average number of hops | $\frac{N}{2} + \frac{M}{4}$ |
| Required bisectional bandwidth | $\frac{N \times M \times I}{2}$ |
| Supported bisectional bandwidth | J × 4 |

Based on Table 1 and Table 2, latency is linearly improved in the network 200 with the hierarchical ring topology. However, a supported bisectional bandwidth remains the same as the network 100 with the single ring topology. It should be noted that although the network 200 illustrates the hierarchical ring network as a two level ring network, the network 200 may be expanded into a K-level hierarchical ring network, where a plurality of $k^{th}$ level rings are connected by a $(k+1)^{th}$ level ring, where K and k are integers and 0≤k≤K. The network performance for a K-level hierarchical ring network comprises a similar trend as the 2-level ring network 200.

Figure 3:
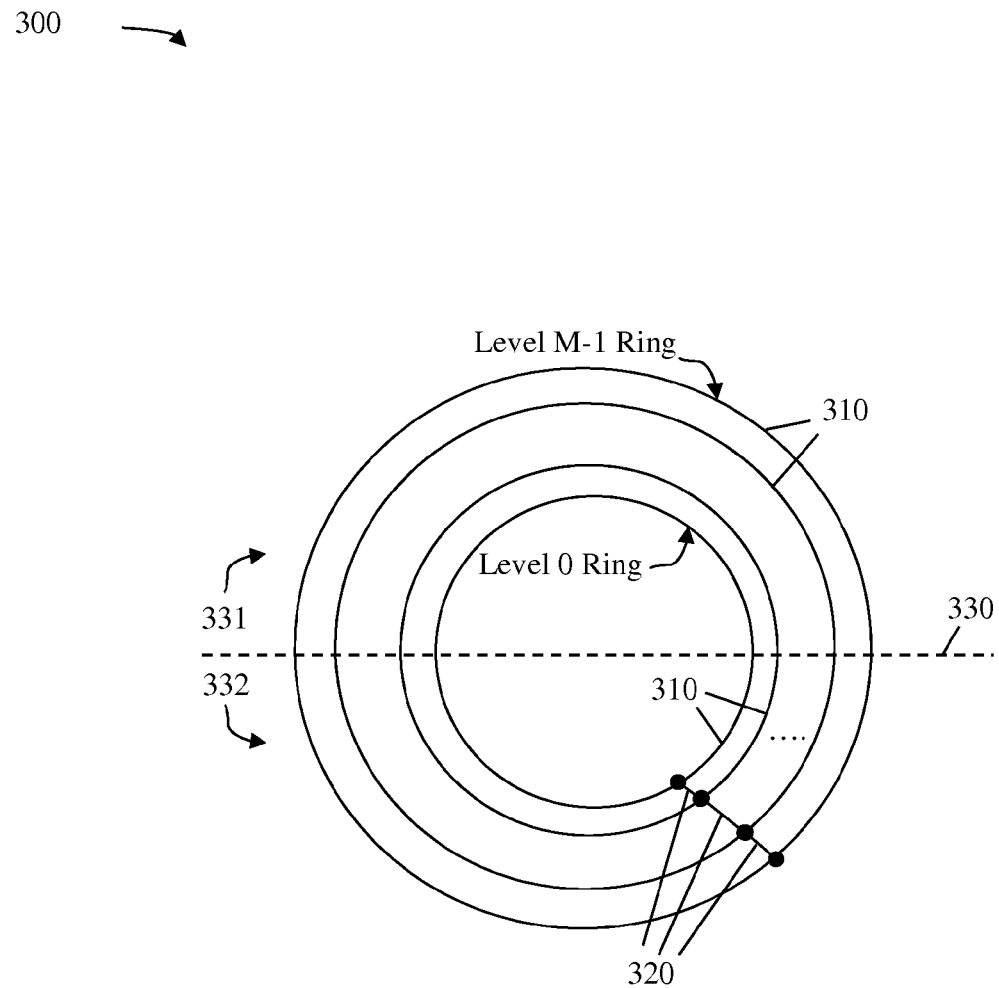
FIG. 3 is a schematic diagram of yet another network that has a parallel ring topology.

FIG. 3 is a schematic diagram of yet another network 300, which has a parallel ring topology. The network 300, sometimes referred to as a parallel ring network, comprises a plurality of ring networks 310 arranged in a concentric-ring configuration. Each ring network 310 may have a structure similar to the network 100. For example, each ring network 310 comprises a plurality of nodes (similar to the nodes 110) that are interconnected by links (similar to the links 120) to form a ring network 310. However, the network 300 divides a total n number of nodes into N×M nodes, where n=N×M, where every N nodes form a ring network 310. Thus, the network 300 comprises M parallel ring network 310, each comprising N nodes. For example, the network 310 in the innermost ring is referred to as the level M−1 ring and the outermost ring is referred to as the level 0 ring. The networks 310 may be interconnected by links 320, similar to the links 120, to enable data transfer between the networks 310.

Similar to the line 130 in the network 100, a line 330 represents a bisectional cut that divides the network 300 into two equal portions 331 and 332, each comprising the same number of nodes. In the network 300, any of the N×M nodes may be a source, and each node may be the destination of one of the M rings. Thus, the maximum number of hops is about N/2 and the average number of hops is about N/4. Similar to the network 100, each node injects data into the network 300 at an injection rate of I and each link supports a bandwidth of J. Then, the required bisectional bandwidth is about $$\frac{N \times M \times I}{2}$$

and the supported bisectional bandwidth is about M×J×4. The following Table 3 summarizes the network performance parameters for the network 300.

TABLE 3

Network Performance for the Network 300

| Maximum number of hops | $\frac{N}{2}$ |
| --- | --- |
| Average number of hops | $\frac{N}{4}$ |
| Required bisectional bandwidth | $\frac{N \times M \times I}{2}$ |
| Supported bisectional bandwidth | M × 4 × J |

By comparing Table 1 and Table 3, both the latency and the bandwidth are linearly improved in the network 300 with the parallel ring topology compared to the network 100. Other embodiments may employ higher parallelism, such as mesh and torus ring, to further improve ring network performance, but at the expense of higher complexity and/or cost.

The present disclosure employs hierarchical ring network topologies to improve network performance, such as latency and bandwidth, with a minimal increase in topology complexity. In an embodiment, a hierarchical ring comprises a base ring with additional levels of recursive shortcuts configured among subsets of nodes. Thus, bandwidth can be increased and latency can be decreased without requiring any additional nodes.

Figure 4:
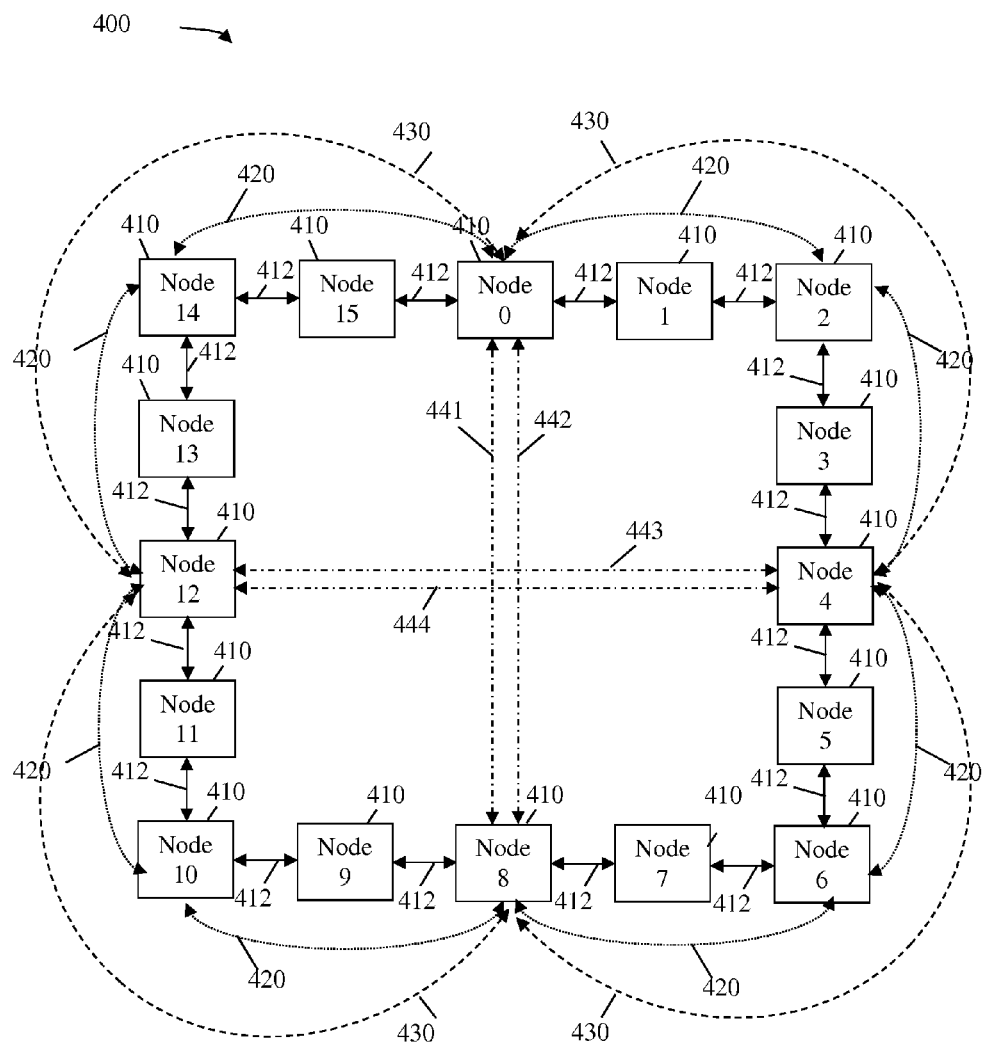
FIG. 4 is a schematic diagram showing an embodiment of a network with a hierarchical ring topology and recursive shortcuts.

FIG. 4 is a schematic diagram showing an embodiment of a network 400 with a hierarchical ring topology and recursive shortcuts. The network 400, sometimes referred to as a recursive ring network, comprises a plurality of nodes 410 interconnected by a plurality of base links 412 to form a base ring. The nodes 410, the base links 412, and the base ring may be similar to the nodes 110, the links 120, and the network 100, respectively. The base links 412 are referred to as level 0 links and the base ring is referred to as the level 0 ring. The network 400 further comprises a plurality of level 1 shortcuts 420 (shown as dotted lines), a plurality of level 2 shortcuts 430 (shown as dashed lines), and a plurality of level 3 shortcuts 441, 442, 443, and 444 (shown as dot-dashed lines). The level 1 shortcuts 420, the level 2 shortcuts 430, and the level 3 shortcuts 441-444 are physical connections similar to the base links 412. As shown in FIG. 4, each level of shortcuts has a regular jump distance in term of node numbers. Specifically, the level 1 shortcuts 420 connect every two nodes 410, the level 2 shortcuts 430 connect every four nodes, and the level 3 shortcuts 441-444 connect every eight nodes. For example, the nodes 410 that are connected by the level 1 shortcuts 420 are also referred to as level 1 nodes, the nodes 410 that are connected by the level 2 shortcuts 430 are also referred to as level 2 nodes, and the nodes 410 that are connected by the level 3 shortcuts 441-444 are also referred to as level 3 nodes. As such, the level 1 nodes interconnected by the level 1 shortcuts 420 form a level 1 ring. The level 2 nodes interconnected by the level 2 shortcuts 430 form a level 2 ring. The level 3 nodes interconnected by the level 3 shortcuts 441 and 442 form a level 3 ring. The level 3 nodes interconnected by the level 3 shortcuts 443 and 444 form another level 3 ring. The level 1 ring, the level 2 ring, and the level 3 rings are referred to as the shortcut rings.

The level 1 nodes 410, the level 2 nodes 410, and the level 3 nodes 410 are selected based on a recursive algorithm. Each higher-level ring connects, via shortcuts, a subset (e.g., some but not all) of nodes from a lower-level ring. For instance, the level 0 ring (e.g., base ring) connects every node 410. The level 1 shortcut ring connects node addresses 0, 2, 4, 6, 8, 10, 12, and 14, which constitute a subset of the nodes 410 in the level 0 ring. Similarly, the level 2 shortcut ring connects node addresses 0, 4, 8, and 12, which constitute a subset of the nodes in the level 1 shortcut ring. Further, one level 3 shortcut ring connects node addresses 0 and 8, and another level 3 shortcut ring connects node addresses 4 and 12. Nodes 0 and 8 (or nodes 4 and 12) constitute a subset of the nodes in the level 2 shortcut ring. Following the same pattern, the selection of nodes for higher-level rings can recursively reach any suitable number of levels.

The nodes 410 in the network 400 may not necessarily have the same number of ports. As shown in FIG. 4, certain nodes, such as those with addresses 0, 4, 8, and 12 belong to multiple shortcut levels, while other nodes, such as those addresses 1, 3, 5, 7, 9, 11, 13, and 15 only have level 0 connections. Further, although FIG. 4 shows regular jump distances at each level of shortcuts, the selection of nodes at each level is arbitrary. Thus, alternate embodiments may comprise irregular or non-uniform jump distances on each level and/or across multiple levels. For instance, in an alternative embodiment, a level 1 ring may be constructed using node addresses 1, 3, 6, 9, 11, and 15, thus having various jump distances. A level 2 ring may be constructed using node addresses 1, 6, 11, and 15, which are a subset of the level 1 nodes. Further, a level 3 ring may be constructed using node addresses 6 and 15, which are a subset of the level 2 nodes. Because the jump distance may vary, the number of nodes needs not be $2^K$ or N*M.

In practice, a regular jump distance is sometimes advantageous, e.g., leading to an easier calculation of routing paths because node indexes are calculated and predictable. For example, assume a ring topology with $N=2^K$ nodes, the links may be set up such that each two nodes adjacent on a level k ring are separated by $(2^k-1)$ nodes, wherein k is an integer that satisfies relationship $0<=k<=(\log_2(N)-1)$. For instance, for the N=16 and k=4 case shown in FIG. 4, links are set up such that each two nodes adjacent on a level k ring are separated by $(2^k-1)$ nodes, where $0<=k<=3$. Specifically, each two nodes adjacent on level 0 ring are separated by 0 nodes (e.g. no intermediate nodes), each two nodes adjacent on level 1 ring are separated by 1 node, each two nodes adjacent on level 2 ring are separated by 3 nodes, and each two nodes adjacent on level 3 ring are separated by 7 nodes. In the network 400, node indexes 4 and 12 are used to form another level 3 ring, and are also separated by 7 nodes.

Further, assume nodes are addressed or labeled clockwise between 0 to (N−1). In an embodiment, the links are set up such that node indexes $(h^k)*I$ are used for the level k ring, where h is an integer representing a smallest jump distance, in terms of nodes, between adjacent nodes in shortcut rings, where k and I are integers, and where relationships $2<=h<=N$, $0<=k<=(\log_h(N)-1)$, and $$0<=I<=\left(\frac{N}{h^k}-1\right)$$

hold true. Specifically, when h=2, the links are set up such that node indexes $(2^k)*I$ are used for the level k ring, where k and I are integers, $0<=k<=(\log_2(N)-1)$, and $$0<=I<=\left(\frac{N}{2^k}-1\right).$$

For the h=2 and N=16 case shown in FIG. 4, links are set up such that node indexes $(2^k)*I$ are used for the level k ring, where $0<=k<=3$, and $$0<=I<=\left(\frac{16}{2^k}-1\right).$$

Specifically, for k=0, level 0 base links use node indexes I, where $0<=I<=15$ (i.e., all nodes are used for the base ring). For k=1, level 1 shortcut links use node indexes 2*I, where $0<=I<=7$, which are node indexes 0, 2, 4, 6, 8, 10, 12, and 14. For k=2, level 2 shortcut links use node indexes 4*I, where $0<=I<=3$, which are node indexes 0, 4, 8, and 12. For k=3, level 3 shortcut links use node indexes 8*I, where $0<=I<=1$, which are node indexes 0 and 8. In the network 400, node indexes 4 and 12 are used to form another level 3 ring, which is an exception to the formula given in this paragraph. Instead, node indexes 4 and 12 are derived using $(2^k)*J$, where k=3, and J=0.5 and 1.5.

Further, assume a case in which h=3 and N=27 (not shown in FIG. 4). Then, links can be set up such that node indexes $(3^k)*I$ are used for the level k ring, where $0<=k<=2$, and $$0<=I<= \left(\frac{27}{3^k} - 1\right).$$

Specifically, for k=0, level 0 base links use node indexes I, where $0<=I<=26$ (i.e., all nodes are used for the base ring). For k=1, level 1 shortcut links use node indexes 3*I, where $0<=I<=8$, which are node indexes 0, 3, 6, 9, 12, 15, 18, 21, and 24. For k=2, level 2 shortcut links use node indexes 9*I, where $0<=I<=2$, which are node indexes 0, 9, and 18. There may also be another level 2 ring that is an exception to the general formula above.

It should be noted that the top level ring(s) (e.g. level 3 rings in the example of FIG. 4) may deviate from the general hierarchical formula to create cross hemisphere jumps at the cost of slightly increased routing complexity. In an alternative embodiment, the top level ring(s) may be required to employ the indexing schemes and/or relationships discussed herein. In an embodiment, each node at addresses $(2^k)*I$ comprises a minimum of $2^{k+1}$ interconnect ports, where $0<=k<=(Log_2(N)-1)$ and $$0<=I<= \left(\frac{N}{2^k} - 1\right).$$

The interconnect ports are configured to send and receive data in the interconnection system.

The recursive shortcut placement scheme described above may be applied to a network with any number of nodes. For example, each node 410 comprises four interconnect ports, where two of the interconnect ports are connected to the base links 412 for transferring data in the base ring, and the other two interconnect ports are connected to the shortcuts 420, 430, or 441-444 for transferring data in the level 1 ring, level 2 ring, or level 3 ring, respectively. To further optimize data flow, the last level shortcuts are limited to transferring data in a particular half of the network 400. For example, the level 3 shortcut 441 transfers data for the left half (e.g., clockwise from node 8 to node 0 or counter clockwise from node 0 to node 8) of the network 400. The level 3 shortcut 442 transfers data for the right half (e.g., clockwise from node 0 to node 8 or counter clockwise from node 8 to node 0) of the network 400. The level 3 shortcut 443 transfers data for the upper half (e.g., clockwise from node 12 to node 4 or counter clockwise from node 4 to node 12) of the network 400. The level 3 shortcut 444 transfers data for the bottom half (e.g., clockwise from node 4 to node 12 or counter clockwise from node 12 to node 4) of the network 400.

In the network 400, any of the nodes 410 may be a source or a destination. However, data transfer may be limited to a clockwise direction or a counter clockwise direction, as discussed more fully below. Thus, the maximum number of hops is about $Log_2(n)-1$ and the average number of hops is about $(Log_2(n))/2$, where n is the total number of nodes 410 in the network 400. Similar to the network 100, 200, and 300, each node injects data into the network 400 at an injection rate of I and each link supports a bandwidth of J. Then, the required bisectional bandwidth is about $$\frac{n \times I}{2}$$

and the supported bisectional bandwidth is about $(Log_2(n)+1) \times J \times 4$. The following Table 4 summarizes the network performance parameters for the network 400.

TABLE 4

| Network Performance for the Network 400 | |
|---|---|
| Maximum number of hops | $Log_2(n) - 1$ |
| Average number of hops | $Log_2(n)/2$ |
| Required bisectional bandwidth | $\frac{n \times I}{2}$ |
| Supported bisectional bandwidth | $(Log_2(n) + 1) \times J \times 4$ |

By comparing Table 4 to Tables 1, 2, and 3, both the latency and the bandwidth are improved in the network 400, where the improvements scale logarithmically instead of linearly.

Although FIG. 4 describes the recursive shortcut placements in a network with a total number of nodes that is a power of 2, the shortcut placement technique may be employed to configure a network with any number of nodes. For example, to generate a network with N number of nodes, where N is not a power of 2, the base ring is generated by employing M number of nodes, where M is the next higher-power of 2. The shortcuts are placed by employing the recursive shortcut placement scheme described above. Subsequently, extra nodes and/or extra links are deleted to provide N number of nodes. If the performance allows, any shortcut except the base links in the base ring may be removed to degenerate the number of shortcuts.

Figure 5A:
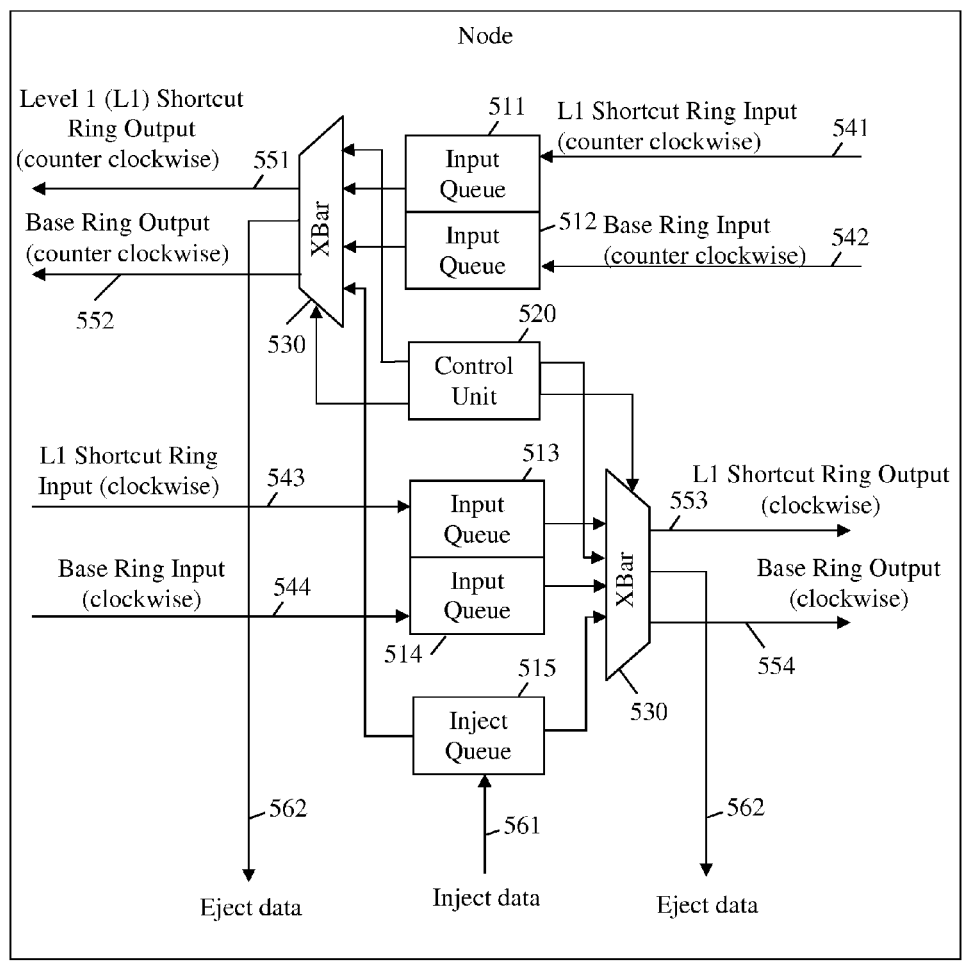
FIG. 5A is a schematic diagram of an embodiment of a logical structural view of a node that is used on level 1 ring of a ring network.

FIG. 5A is a schematic diagram of an embodiment of a logical structural view of a node 500 that is used on level 1 (but not level 2, or 3, or higher) ring of a ring network. The node 500 may represent any of nodes labeled 2, 6, 10, and 14 in the network 400 in FIG. 4. As shown in FIG. 4, different nodes may have different number of ports since they are involved in different levels of shortcut rings. FIG. 5A illustrates the logical structure of the node 500 for performing data transfer and flow control. The node 500 comprises a plurality of queues 511, 512, 513, 514, and 515, a control unit 520, and a plurality of crossbar (XBar) switches 530. The queues 511-515 may be a single block of memory, such as random-access memory (RAM), partitioned into a plurality of portions, each corresponding to a queue 511-515. Alternatively, each queue 511-515 may be a separate memory block. The queues 511-514 are configured to interface with interconnect input/output (I/O) ports, such as the interconnect ports 111. When operating in the network, each interconnect port receives data transferring in a clockwise direction and transmits data in a counterclockwise direction or receives data transferring in a counter clockwise direction and transmits data in a clockwise direction. For example, the queue 511 is configured to buffer data received from a counter clockwise shortcut ring input path 541, where the data is travelling in a counter clockwise in the level 1 shortcut ring. The queue 512 is configured to buffer data received from a counter clockwise base ring input path 542, where the data is travelling in a counter clockwise in the base ring (e.g., formed by base links 412). The queue 513 is configured to buffer data received from a clockwise shortcut ring input path 543 and the queue 514 is configured to buffer data received from a clockwise base ring input path 544. The queue 515 is configured to interface with an I/E port, such as the I/E port 112. For example, the queue 515 is configured to buffer data generated by the node 500 (e.g., injected via inject path 561) and destined for a node, such as a node 410 in the network 400.

The Xbar switches 530 are devices configured to connect multiple inputs to multiple outputs. For example, the Xbar switches 530 comprise cross-point matrices that provide a connection point between any input and output pair. The control unit 520 comprises control logics configured to perform routing control, flow control, and/or other control functions to facilitate data transfer in and out of the node 500. A first of the Xbar switches 530 is coupled to the queues 511-512 and 515 and the control unit 520 for switching counter clockwise data. A second of the Xbar switches 530 is coupled to the queues 513-514 and 515 and the control unit 520 for switching clockwise data. The control unit 520 performs routing to determine a forwarding path for the data buffered in the queues 511-515 and configures the XBar switches 530 to route the data to a port corresponding to the forwarding path. For example, the data buffered in the queues 511-514 may be sent to a shortcut ring or a base ring or ejected from the network (e.g., via eject paths 562) when the node 500 is the destination. As shown in FIG. 5A, incoming data traveling in a counter clockwise direction is routed to an output path 551 towards a shortcut ring or an output path 552 towards the base ring in the counter clockwise direction. Incoming data traveling in a clockwise direction is routed to an output path 553 towards a shortcut ring or an output path 554 towards the base ring in the clockwise direction. Data initiated by the node 500 may be routed to any one of the output paths 551-554 according to the forwarding path selected by the control unit 520.

Figure 5B:
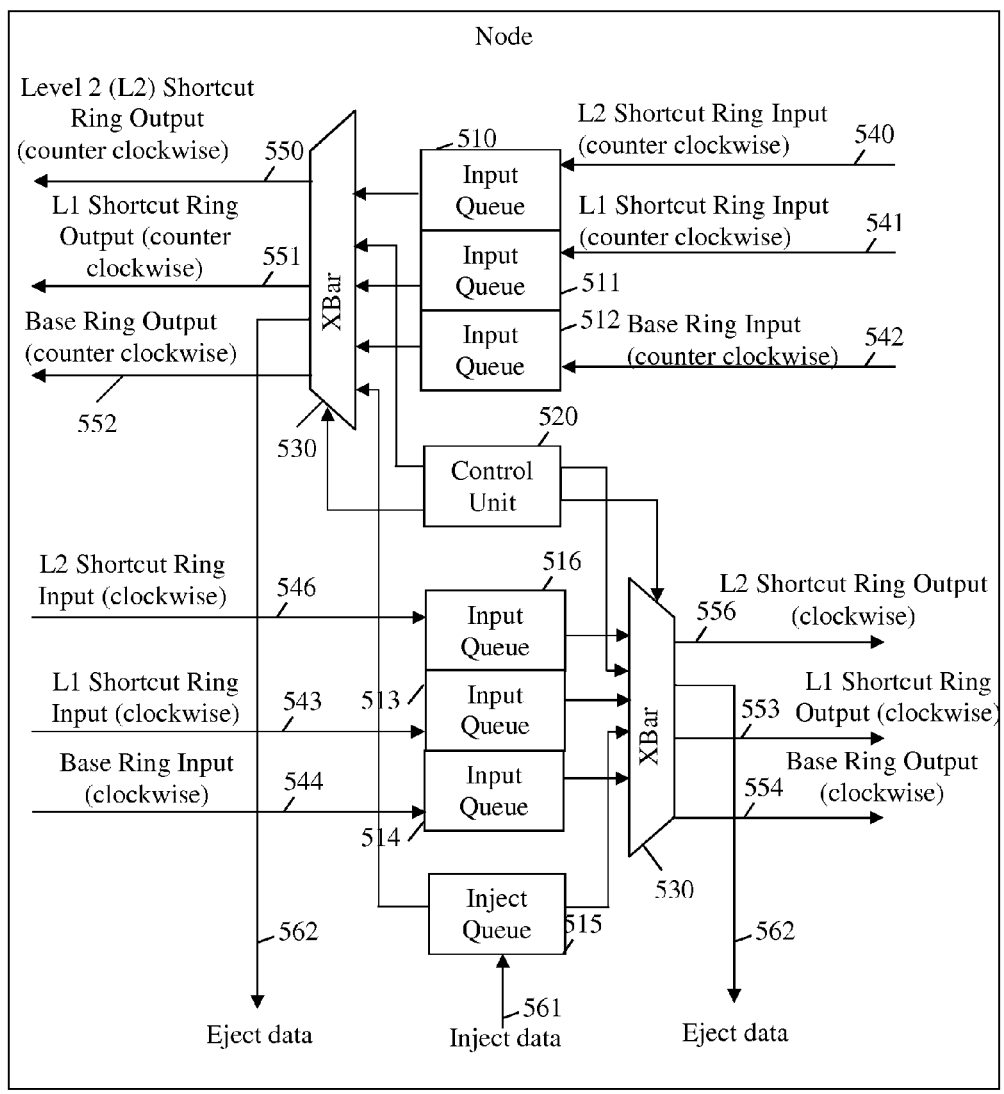
FIG. 5B is a schematic diagram of an embodiment of a logical structural view of a node that is used on levels 1-2 rings of a ring network.

FIG. 5B is a schematic diagram of an embodiment of a logical structural view of a node 570 that is used on levels 1-2 rings of a ring topology network. Although the node 570 may not represent any nodes in the network 400 as shown in FIG. 4 because the nodes labeled 0, 4, 8, and 12 are used for levels 1-3 rings, the node 570 may represent nodes 4 and 12 if their level 3 ring is removed. Additionally, the node 570 may be in a network where level 4 or higher ring is available. One of ordinary skill in the art would recognize that most aspects of the node 570 is the same as or similar to the node 500 in FIG. 5A, except that there is one more level 2 shortcut ring input/output queue in both the clockwise and counter clockwise directions. The queues 510 and 516 for the level 2 ring are configured to interface with interconnect I/O ports, such as the interconnect ports 111. For example, the queue 510 is configured to buffer data received from a counter clockwise level 2 shortcut ring input path 540, where the data is travelling in a counter clockwise in the level 2 shortcut ring. The queue 516 is configured to buffer data received from a clockwise level 2 shortcut ring input path 546.

The control unit 520 performs routing to determine a forwarding path for the data buffered in the queues 510 and 516 and configures the XBar switches 530 to route the data to a port corresponding to the forwarding path. For example, the data buffered in the queues 510 and 516 may be sent to a shortcut ring or a base ring or ejected from the network (e.g., via eject paths 562) when the node 500 is the destination. As shown in FIG. 5B, incoming data from the queue 510 traveling in a counter clockwise direction is routed to an output path 550 towards a level 2 shortcut ring, the output path 551 towards a level 1 shortcut ring, or the output path 552 towards the base ring in the counter clockwise direction. Incoming data traveling from the queue 516 in a clockwise direction is routed to an output path 556 towards a level 2 shortcut ring, the output path 553 towards a level 1 shortcut ring, or the output path 554 towards the base ring in the clockwise direction. Data initiated by the node 500 may be routed to any one of the output paths 550-554 and 556 according to the forwarding path selected by the control unit 520.

Figure 5C:
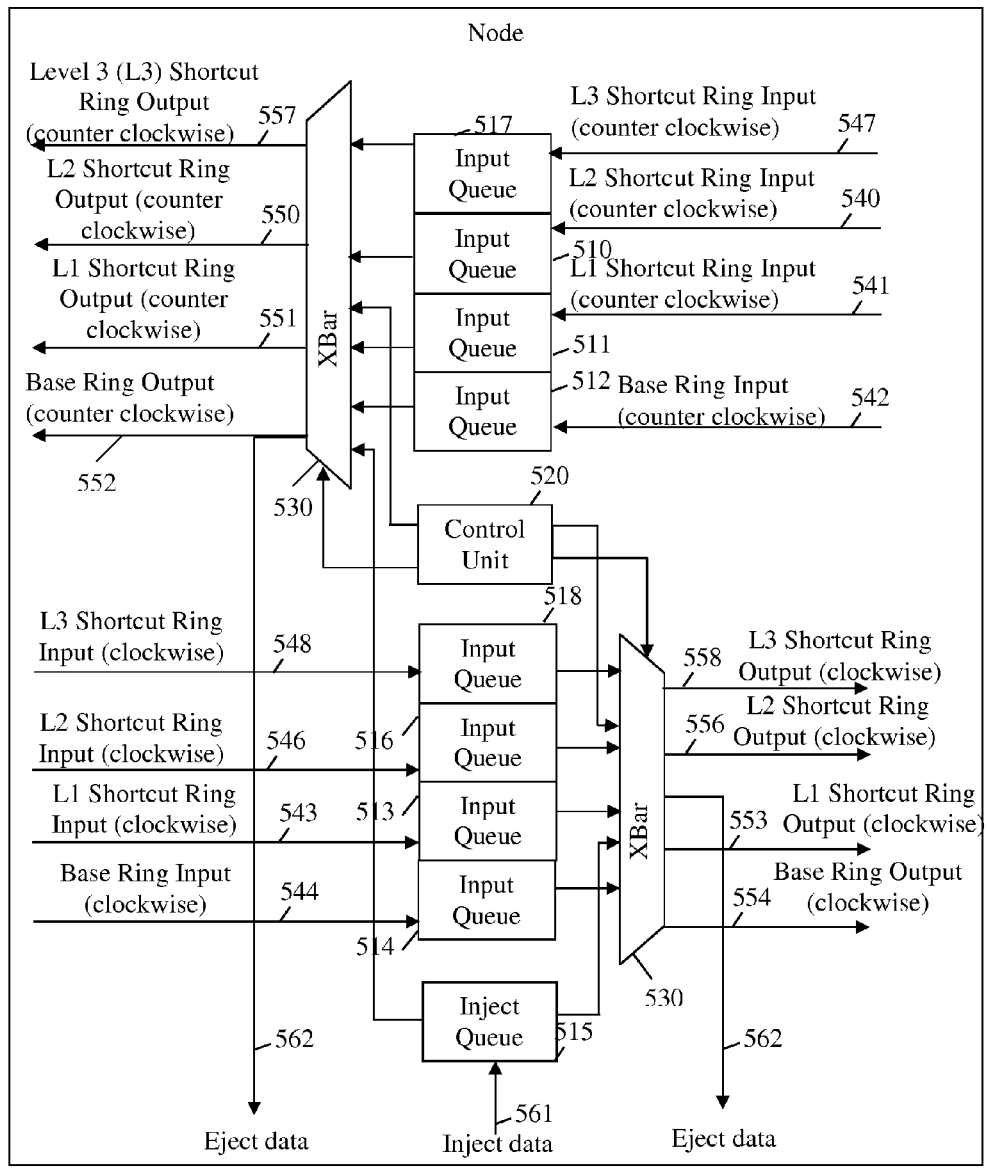
FIG. 5C is a schematic diagram of an embodiment of a logical structural view of a node that is used on levels 1-3 rings of a ring network.

FIG. 5C is a schematic diagram of an embodiment of a logical structural view of a node 590 that is used on levels 1-3 rings of a ring topology network. The node 500 may represent any of nodes labeled 0, 4, 8, and 12 in the network 400. One of ordinary skill in the art would recognize that most aspects of the node 590 is the same as or similar to the node 500 in FIG. 5A and the node 570 in FIG. 5B, except that there is one more level 3 shortcut ring input/output queue in both the clockwise and counter clockwise directions. The queues 517 and 518 for the level 3 ring are configured to interface with interconnect I/O ports, such as the interconnect ports 111. For example, the queue 517 is configured to buffer data received from a counter clockwise level 3 shortcut ring input path 547, where the data is travelling in a counter clockwise in the level 3 shortcut ring. The queue 518 is configured to buffer data received from a clockwise level 3 shortcut ring input path 548.

The control unit 520 performs routing to determine a forwarding path for the data buffered in the queues 517 and 518 and configures the XBar switches 530 to route the data to a port corresponding to the forwarding path. For example, the data buffered in the queues 517 and 518 may be sent to a shortcut ring or a base ring or eject from the network (e.g., via eject paths 562) when the node 500 is the destination. As shown in FIG. 5C, incoming data from the queue 517 traveling in a counter clockwise direction is routed to an output path 557 towards a level 3 shortcut ring, the output path 550 towards a level 2 shortcut ring, the output path 551 towards a level 1 shortcut ring, or the output path 552 towards the base ring in the counter clockwise direction. Incoming data traveling from the queue 518 in a clockwise direction is routed to an output path 558 towards a level 3 shortcut ring, the output path 556 towards a level 2 shortcut ring, the output path 553 towards a level 1 shortcut ring, or the output path 554 towards the base ring in the clockwise direction. Data initiated by the node 500 may be routed to any one of the output paths 550-554 and 556-558 according to the forwarding path selected by the control unit 520. As such, nodes 500, 570, and/or 590 may be employed to implement method 700 and/or any other method disclosed herein.

Figure 6:
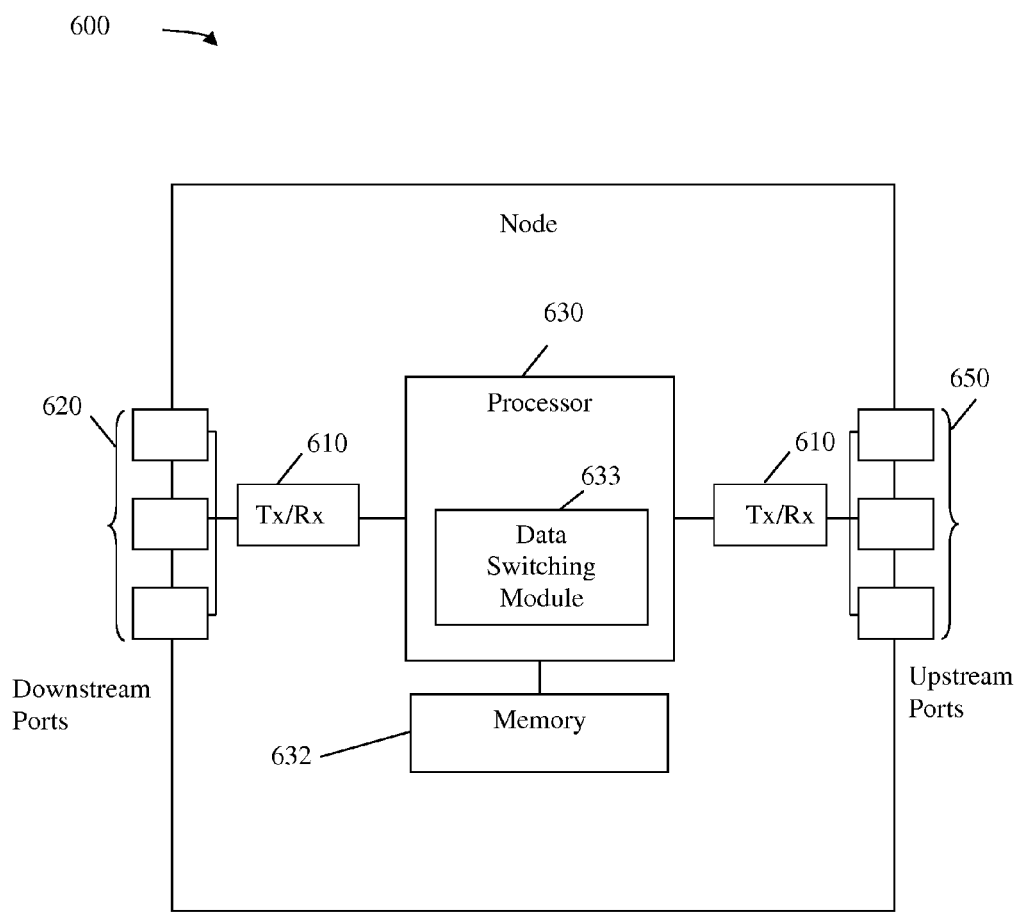
FIG. 6 is a schematic diagram of another example embodiment of a node.

FIG. 6 is a schematic diagram of another example embodiment of a node 600, which may act as a node in a hierarchical network, such as the network 400. For instance, the node 600 may be a router, switch, and/or bridge when the network is a communication network. In an SoC and/or NoC, the node 600 may be a processing core, memory block, timing source, and/or a peripheral. In a data center, the node 600 may be network equipment, such as a server. The node 600 may be configured to implement and/or support the routing mechanisms described herein. Node 600 may be implemented in a single node or the functionality of node 600 may be implemented in a plurality of nodes. One skilled in the art will recognize that the term node encompasses a broad range of devices of which node 600 is merely an example. Node 600 is included for purposes of clarity of discussion, but is in no way meant to limit the application of the present disclosure to a particular node embodiment or class of node embodiments. At least some of the features and/or methods described in the disclosure may be implemented in a network apparatus or module such as a node 600. For instance, the features and/or methods in the disclosure may be implemented using hardware, firmware, and/or software installed to run on hardware. As shown in FIG. 6, the node 600 may comprise transceivers (Tx/Rx) 610, which may be transmitters, receivers, or combinations thereof. A Tx/Rx 610 may be coupled to plurality of downstream ports 620 for transmitting and/or receiving frames from other nodes and a Tx/Rx 610 may be coupled to plurality of upstream ports 650 for transmitting and/or receiving frames from other nodes, respectively. A processor 630 may be coupled to the Tx/Rx 610 to process the frames and/or determine which nodes to send the frames to. The processor 630 may comprise one or more multi-core processors and/or memory devices 632, which may function as data stores, buffers, etc. For example, memory devices 632 may store information for implementing method 700. Processor 630 may be implemented as a general processor or may be part of one or more application specific integrated circuits (ASICs) and/or digital signal processors (DSPs). Processor 630 may comprise a data switching module 633, which may perform data switching and/or flow control functions of a node 410 and implement method 700, as discussed more fully below, and/or any other method discussed herein. In an alternative embodiment, the data switching module 633 may be implemented as instructions stored in the memory devices 632, which may be executed by the processor 630. The memory device 632 may comprise a cache for temporarily storing content, e.g., a RAM. Additionally, the memory device 632 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the node 600, at least one of the processor 630 and/or memory device 632 are changed, transforming the node 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The disclosed hierarchical networks, such as the network 400, may employ various routing rules and mechanisms to route data in the network. To identify a forwarding path from a source node to a destination node, which may be any nodes in the network, a shortest path is selected from either a clockwise transfer direction or a counter clockwise transfer direction such that data is transferred in a single direction from the source to the destination. The shortest path refers to the path with the minimum number of hops. The shortest path may include base links, such as the base links 412, and/or shortcuts, such as the shortcuts 420, 430, and/or 441-444. After identifying the shortest path, the node in a next hop and the transfer direction may be stored in a routing table. During real-time network operations, when the node receives a data from the network, the node determines a next hop for forwarding the data based on the destination of the data. If the destination is not the node itself, the node looks up the next hop in the routing table and forward the data to the next hop, which may be reached via a base link or a shortcut link. If the destination is the node itself, the data terminates at the node. Thus, the real-time routing is relatively simple. It should be noted that the routing table does not comprise history of the forwarding path, thus the routing table is stateless.

As a routing rule, a routing path from a node I to a node J, where I and J are node labels, should be either all clockwise or all counter clockwise. Under this rule, directional switching is not allowed. For instance, when routing from node 1 to node 9 in the network 400, path 1→0→8→9 (3 hops) is the shortest, but there is a directional switch because 1→0 is counter clockwise and 8→9 is clockwise. Consequently, such path is not taken. Instead, an all-clockwise path 1→2→4→8→9 (4 hops), or an all-counter clockwise path 1→0→12→10→9 (4 hops), should be selected. In an embodiment, there are two layers of routing rules, the first of which is the single direction rule, and second of which is the all possible routes rule. For example, in the example above, if directional switching gives the shortest routing path after comparison of multiple paths, the rule is adjusted to allow directional switching.

Since the shortest path from node A to B may not be unique (e.g., path 1→2→4→8→9 (4 hops) and path 1→0→12→10→9 both have four hops), there may be a decision algorithm to determine the optimal route. For instance, one direction (e.g., clockwise) can be set as the default direction to break hop count ties. Due to the complexity of the algorithm, in some embodiments the routing solutions are to calculate off line, e.g., by exploring all the possible paths from I to J then picking the shortest one, and stored in a routing table. The result is reflected in a shortest path table for any node I to J. The table would have N×(N−1) entries, where N represents number of nodes in the ring network. Each entry contains the full hop list along the path. The routing table should have N−1 entries and K bits if the node connects to K levels of recursive rings. For example, if the shortest path from node 1 to node 13 is 1→0→15→14→13. The routing table at node 1 for destination node 13, would be the base ring path in the counter clockwise direction.

If the recursive shortcuts follow some regularity, then it may be more convenient to build the logic according to a regular equation. For example, assume there are $N=2^K$ nodes in a ring topology, with nodes labeled clockwise between 0 to N−1 (e.g., FIG. 4 shows N=16 and k=4 case), and that a message is going from node I to node J, where I and J are node labels. In an embodiment, the routing of the message takes the clockwise path if $|J-I|<=N/2$. Otherwise if $|J-I|>=N/2$, the routing takes the counter clockwise path. En route to the destination J, at an intermediate node X, the message takes the path with the largest step size towards the final destination.

The disclosed hierarchical networks may additionally employ VCs to avoid deadlocks. In a hierarchical network (e.g., the network 400), each node may transfer data in a base ring or a shortcut ring in a clockwise direction or in a counter clockwise direction. A node may support such a data transfer scheme by employing a number of physical channels. For example, for a node participating in a level 1 shortcut ring, a first physical channel may be employed for transferring data in a clockwise direction in the shortcut ring. A second physical channel may be employed for transferring data in a counter clockwise direction in the shortcut ring. A third physical channel may be employed for transferring data in a clockwise direction in the base ring. A fourth physical channel may be employed for transferring data in a counter clockwise direction in the base ring. A deadlock may occur when an incoming data arrives at a physical channel while the physical channel is busy operating on a previously received data. To avoid such a deadlock, the node may employ two VCs for each physical channel. For example, an incoming data may arrive at a physical channel while one VC is busy operating on a previously received data, but the other VC may accept the incoming data. To implement the VC scheme, each node may employ separate buffers for each VC. For example, to support two VCs, the node 500 may partition each queue 511-514 into two separate portions, each mapped to a VC and each configured to operate independently.

Data transfer may usually be limited to a single transfer direction in a clockwise direction or a counter clockwise direction in the network. The limitation on the single transfer direction is based on the employment of physical channels. By limiting the data transfer to a single transfer direction, the probabilities of contentions and/or deadlocks may be reduced in the network. However, when VCs are employed, the transfer direction may be changed between a source-destination pair. For example, when two VCs are employed, the transfer direction may be changed once in a forwarding path between a source-destination pair.

To incorporate the VC scheme with two VCs, VC0 and VC1, into the routing algorithm, a shortest path is selected for a source-destination pair, where the shortest path may comprise at most one transfer direction switch. For example, the first hop beginning at a source is assigned to VC0, subsequent hops in the same transfer direction as the first hop are also assigned to VC0, and a hop that switches the transfer direction is assigned to VC1. The routing algorithm allows a switch in transfer direction to occur under two conditions. The first condition occurs when a second hop traverses through a link between a node with address 0 and a node with address N−1 (e.g., from node 0 to node N−1 or from node N−1 to node 0), where N is the total number of nodes in the network. The second condition occurs when a hop subsequent to the second hop switches the transfer direction. It should be noted that although the VC scheme is described with the employment of two VCs, the VC scheme may be applied to multiple VCs. In general, the maximum number of transfer direction switches may be configured to be about one less than the total number of VCs.

Figure 7:
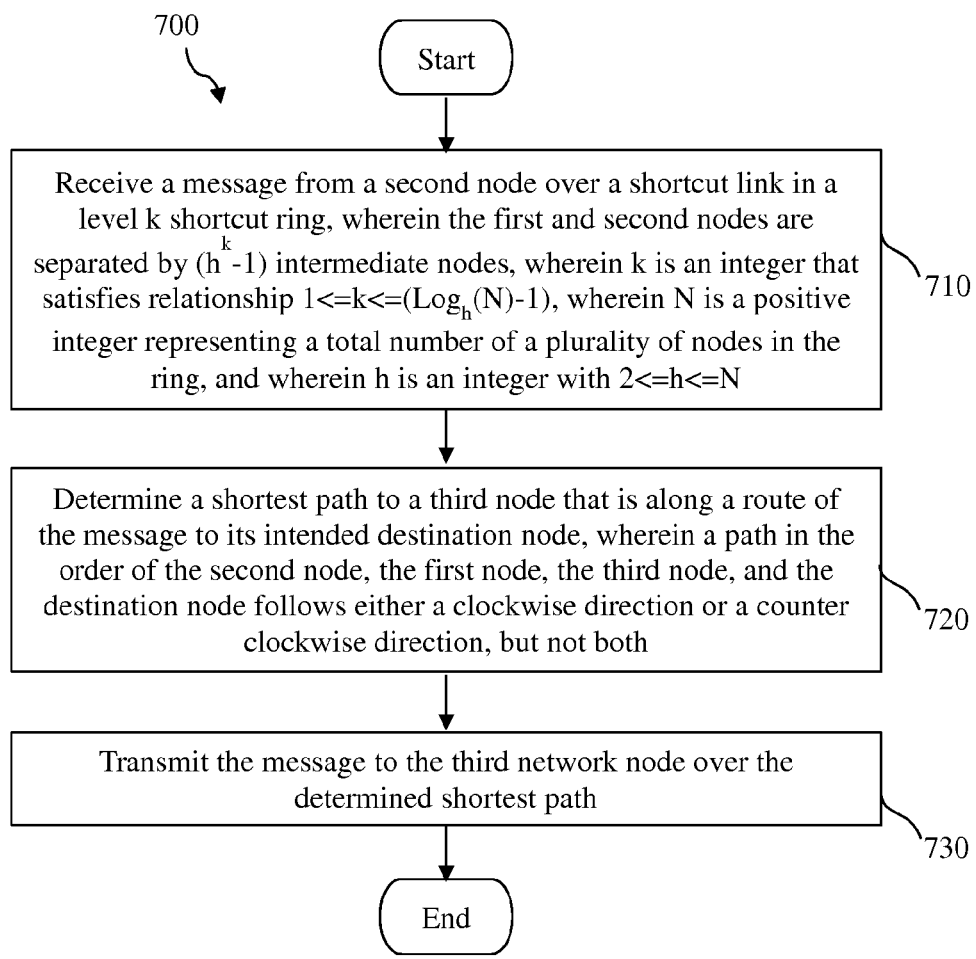
FIG. 7 is a flowchart of an embodiment of a method for routing messages in an interconnect network with a ring topology.

FIG. 7 is a flowchart of an embodiment of a method 700 for routing messages in an interconnect network with a ring topology (e.g., the network 400). The method 700 may be implemented by a node, such as a node 410. At step 710, the node receives a message from a second node over a shortcut link in a level k shortcut ring. In an embodiment, the first and second nodes are separated by ($h^k$−1) intermediate nodes, where k is an integer that satisfies relationship 1<=k<=($\text{Log}_2$(N)−1), where N is a positive integer representing a total number of a plurality of nodes available in the network topology, and where h is an integer that satisfies 2<=h<=N. As discussed above, FIG. 4 shows an exemplary case in which N=16 and h=2. At step 720, the node determines a shortest path to a third node that is along a route of the message to its intended destination node. In an embodiment, a path in the order of the second node, the first node, the third node, and the destination node follows either a clockwise direction or a counter clockwise direction, but not both. However, there may be exception to this rule if switch of direction may yield a shorter path.

At step 730, the node transmits the message to the third network node over the determined shortest path. In an embodiment, the plurality of nodes are arranged such that the nodes are representable using consecutive integer addresses ranging from 0 to N−1 in a single direction on the ring topology. In this case, determining the shortest path comprises predicting an address of the third node based on the fact that all shortcut links are set up such that node addresses ($h^k$)*I are used for a level k ring, wherein I is an integer that satisfies relationship $$0<=I<=\left(\frac{N}{h^k}-1\right).$$

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. In a recursive ring network topology comprising a plurality of nodes, a node comprising:
   a first port for coupling to an adjacent first node via a base link in a base ring;
   a second port for coupling to a non-adjacent second node via a first shortcut link in a first level shortcut ring;
   a third port for coupling to a non-adjacent third node via a second shortcut link in a second level shortcut ring, wherein the second shortcut link bypasses at least one intermediate node not bypassed by the first shortcut link, wherein a number of intermediate nodes positioned between the third node and the node along the base ring is at least double a number of intermediate nodes between the second node and the node along the base ring, wherein all nodes connected to the second level shortcut ring are also connected to the first level shortcut ring, and wherein at least one node connected to the first level shortcut ring is not connected to the second level shortcut ring;

at least one receiver coupled to the first, second, and third ports, wherein the receiver is configured to receive a first message from the first node over the base link, receive a second message from the second node over the first shortcut link and receive a third message from the third node over the second shortcut link; and a processor coupled to the at least one receiver and configured to determine a first shortest path to a first destination for the first message, a second shortest path to a second destination for the second message, and a third shortest path to a third destination for the third message.

2. The node of claim 1, wherein N is a positive integer representing a total number of the plurality of nodes, wherein the second level shortcut ring is a level k ring, wherein k is an integer that satisfies relationship $2<=k<=(Log_h(N)-1)$, wherein h is an integer that satisfies $2<=h<=N$, and wherein the third node and the node are separated by $(h^k-1)$ intermediate nodes along the base ring.

3. The node of claim 1, wherein the plurality of nodes are arranged such that the nodes are represented using consecutive integer addresses ranging from 0 to N-1 in a single direction on the ring network topology, wherein N is a positive integer representing a total number of the plurality of nodes, wherein the links are configured such that node addresses $(h^k)*I$ are employed for a level k ring, and wherein h, k, and I are integers that satisfy relationships $2<=h<=N$, $0<=k<=(Log_h(N)-1)$, and $$0<=I<=\left(\frac{N}{h^k}-1\right).$$

4. The node of claim 1, further comprising a transmitter coupled to the processor and configured to:
transmit the first message over the first shortest path to the first destination;
transmit the second message over the second shortest path to the second destination; and
transmit the third message via the third shortest path to the third destination.

5. The node of claim 4, further comprising at least one memory coupled to the receiver and configured to:

store the first message in a first queue for storing messages from the base ring;
store the second message in a second queue for storing messages from the first level shortcut ring; and
store the third message in a third queue for storing messages from the second level shortcut ring.

6. The node of claim 5, wherein the at least one memory is further configured to store a shortest path routing table, and wherein determining the first, second, and third shortest paths comprises looking up entries in the shortest path routing table.

7. The node of claim 1, wherein the node employs at least two virtual channels (ICs) for transferring messages, and wherein a routing direction of the messages is changed by switching between virtual channels.

8. A method of routing messages in a recursive hierarchical ring network topology by a first node, the method comprising:
receiving a message from a second node over a shortcut link in a level k shortcut ring, wherein the first and second nodes are separated by $(h^k-1)$ intermediate nodes along a base ring, wherein k is an integer that satisfies relationship $1<=k<=(Log_h(N)-1)$, wherein N is a positive integer representing a total number of a plurality of nodes available in the network topology, and wherein h is an integer that satisfies $2<=h<=N$;
determining a shortest path to a third node that is along a route of the message to an intended destination node, wherein the shortest path is selected from a group of paths that traverse the recursive hierarchical ring network topology in a clockwise direction or a counter clockwise direction, but not both; and
transmitting the message to the third node over the determined shortest path.

9. The method of claim 8, wherein the plurality of nodes are represented by consecutive integer addresses ranging from 0 to N-1 in a single direction on the recursive hierarchical ring network topology, and wherein determining the shortest path comprises by predicting available shortcuts to the third node by presuming that all shortcut links are configured such that node addresses $(h^k)*I$ are used for a level k ring, wherein I is an integer that satisfies relationship $$0<=I<=\left(\frac{N}{h^k}-1\right).$$

* * * * *

UNITED STATES PATENT AND TRADEMARK OFFICE
CERTIFICATE OF CORRECTION

PATENT NO. : 9,600,440 B2  
APPLICATION NO. : 14/528955  
DATED : March 21, 2017  
INVENTOR(S) : Iulin Lih and William Lynch Page 1 of 1

It is certified that error appears in the above-identified patent and that said Letters Patent is hereby corrected as shown below:

On the Title Page

References Cited, U.S. Patent Documents:
Delete "2001/4007892 3/2014 Thurbert al al." and insert -- 2014/007892 3/2014 Thurbert et al. --

In the Claims

Column 18, Lines 12-15, Claim 7, should read:
7. The node of claim 1, wherein the node employs at least two virtual channels (VCs) for transferring messages, and wherein a routing direction of the messages is changed by switching between virtual channels.

Signed and Sealed this  
Twenty-third Day of May, 2017

Michelle K. Lee  
*Director of the United States Patent and Trademark Office*